US00RE46048E

(19) United States
(12) Reissued Patent
Burenga

(10) Patent Number: US RE46,048 E
(45) Date of Reissued Patent: Jul. 5, 2016

(54) SKID STEER BALE SPEAR

(71) Applicant: Thomas I Burenga, Litchfield, IL (US)

(72) Inventor: Thomas I Burenga, Litchfield, IL (US)

(73) Assignee: Worksaver, Inc., Litchfield, IL (US)

(21) Appl. No.: 13/998,645

(22) Filed: Nov. 20, 2013

Related U.S. Patent Documents

Reissue of:

(64) Patent No.: 8,061,956
Issued: Nov. 22, 2011
Appl. No.: 12/313,627
Filed: Nov. 21, 2008

U.S. Applications:

(60) Provisional application No. 61/003,923, filed on Nov. 21, 2007.

(51) Int. Cl.

| | |
|---|---|
| ***B66F 9/12*** | (2006.01) |
| ***E02F 3/40*** | (2006.01) |
| ***A01D 87/00*** | (2006.01) |
| ***A01D 87/12*** | (2006.01) |

(52) U.S. Cl.
CPC ..... *A01D 87/127* (2013.01)

(58) Field of Classification Search
USPC ..... 414/24.5, 724, 727, 912; 37/403, 405; 294/91
See application file for complete search history.

(56) References Cited

U.S. PATENT DOCUMENTS

| | | | | | |
|---|---|---|---|---|---|
| D243,326 | S | * | 2/1977 | Vandewater | D15/28 |
| 4,056,205 | A | * | 11/1977 | Etzler, IV | 414/722 |
| 4,175,900 | A | * | 11/1979 | Etzler | 414/787 |
| 4,243,356 | A | * | 1/1981 | Takojima | 414/723 |
| 4,275,985 | A | * | 6/1981 | Schremmer | 414/722 |
| 4,674,786 | A | * | 6/1987 | Lynch | 294/120 |
| 4,850,789 | A | * | 7/1989 | Zimmerman | 414/703 |
| 5,071,311 | A | * | 12/1991 | Foster et al. | 414/724 |
| 5,129,775 | A | * | 7/1992 | Coats et al. | 414/24.5 |
| 5,820,332 | A | * | 10/1998 | Philips et al. | 414/723 |
| 6,146,081 | A | * | 11/2000 | Anderson | 414/685 |
| 6,907,874 | B1 | * | 6/2005 | Faircloth | 125/13.01 |
| 6,971,696 | B1 | * | 12/2005 | Koester et al. | 294/120 |
| 7,008,162 | B2 | * | 3/2006 | Westendorf et al. | 414/24.5 |
| 7,182,568 | B2 | * | 2/2007 | McGinnes | 414/24.5 |
| 2004/0126217 | A1 | * | 7/2004 | Westendorf et al. | 414/685 |

* cited by examiner

*Primary Examiner* — Joseph Kaufman
(74) *Attorney, Agent, or Firm* — Paul M. Denk

(57) ABSTRACT

A skid steer bale spear has a single member, or cross tube, to which joins at least one spear and balance spikes. The member then has plates proximate each end welded to the member for connection to a tractor or skid steer loader following the spacing and orientation for the Universal Skid Steer Quick Attach. Additionally, this skid steer bale spear includes a rollback angle to the spear, foot grips, backstops, and detachable spears and spikes. This skid steer bale spear uses less resources, capital, labor, and materials for manufacturing. The member, spear, and balance spikes can be shipped and merchandised in a compact form. At the farm or the ranch, the skid steer bale spear assembles in minutes with hand tools and readily connects to a tractor or loader.

8 Claims, 3 Drawing Sheets

SKID STEER BALE SPEAR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This non-provisional patent application claims priority to the provisional patent application having Ser. No. 61/003,923, which was filed on Nov. 21, 2007.

BACKGROUND OF THE INVENTION

The skid steer bale spear generally relates to agricultural implements and more specifically to a spear upon a frame that connects to a skid steer loader.

Farmers and growers raise crops of various kinds including hay, alfalfa, and cotton, among others that are baled for storage, handling, and transportation. The bales usually bind the dried crops, such as hay, into a stackable form such as a rectangle or a round cylinder. Bales are generally made by a machine towed, or propelled, by the farmer, or grower, at the time of harvesting the crop, such as hay in the summer. The hay, once baled, becomes feed for livestock. The hay bales can then be loaded and transported for various uses and to many locations.

Round bales have seen increasing usage over the years. The round bales are formed as hay, or other crop, is collected in windrows and then rolled into a cylinder with flat ends by machine. The cylinders are then spaced along the path of travel of a baling machine, often towed behind a tractor. A farmer can leave the bales in place until needed or the farmer can move the bales. Bales can be collected and stored for the farmer's own use or sold to other users of the bales. However, a round bale can weigh upwards of 1500 pounds.

Generally bales are moved using forklifts, cranes, and other material handling equipment. Such equipment though has proven expensive to members of the farming community and less suited to rugged conditions encountered in the fields. Farmers seek to utilize equipment adept on fields and rugged locales in new ways. Such equipment includes the skid steer loader, often called a Bobcat®. Farmers use skid steer loaders for a whole host of activities limited only by the attachments available. Generally skid steer loaders have a chassis with a roll cage to protect the farmer. Upon the chassis, the farmer sits in the seat with the engine and the fuel tank behind the farmer. The wheels, or sometimes treads, are beside the seat and the hydraulic arms extend from the chassis near the engine, along side the roll cage, and in front of the roll cage. In usage, the farmer sits in the skid steer loader to operate it and watches the hydraulic arms lift and manipulate load in front of the farmer. Over the years, various manufacturers have made devices that attach to the arms of a skid steer loader. The devices include post hole diggers, hydraulic picks and hammers, hydraulic saws, fork lifts, lift baskets, buckets, snowplows, rotary brushes, and a whole host of others. The various devices attach to the arms using a common plate and hooks across the arms and nearby hydraulic fitting. The common plate and hooks are now known as the Universal Skid Steer Quick Attach.

Though skid steer loaders are adept and versatile equipment on farms, farmers and ranchers still use tractors for various tasks. Tractors and skid steer loaders have bucket attachments upon the front. The bucket generally scoops up material and lifts it to a higher height, often for dumping into a pile or onto a truck. As a lifting attachment, buckets can also move bales placed inside them by farm hands. Buckets attach to the arms of tractor using pins following the tractor manufacturer's layout of the arms and arrangement of connectors. With many tractor manufacturers selling tractors, variations in connections have occurred. Device manufacturers thus make versions of the same device suitable for connection to different makes of tractor. In recent years however, farm tractor and front loader manufacturers reached agreement on how devices would connect to the lifting arms of tractors. Recognizing the success of the Universal Skid Steer Quick Attach with skid steer loaders, the farm tractor and front loader manufacturers adopted that attachment means as a standard for the products of their industries. Manufacturers can now make devices that fit both tractors and skid steer loaders without individual models for brands.

DESCRIPTION OF THE PRIOR ART

As buckets have a generally rectangular front opening, a bucket grasps a bale poorly beyond ramming the bucket into a bale. Over the years, farmers have developed various spears that penetrate a bale and can support the weight of a bale when the spear is lifted. The spears include a dedicated implement connected to the arms of a loader or tractor, and a temporary implement that attaches to a bucket or blade connected to the arms of a loader or tractor. A spear lifts and moves bales at the command of the tractor operator. However, the dedicated spear limits the tractor to performing bale moving tasks. Other tasks require the operator to change the implement from the arms of a tractor, resulting in down time for the tractor and storage for the implement.

Temporary implements generally attach to the bucket of a tractor in a removable manner. The temporary bale implement lightly limits the tractor to bale tasks as it removes and installs readily to a bucket. When using a temporary bale implement, the bucket remains attached to the arms of the tractor and need not be removed as in the dedicated spear implement usage. A tractor operator can readily switch from bale moving to lifting a load in the bucket by detaching the bale implement from the bucket.

Some temporary spear implements mechanically connect to a bucket. The implement has a frame that fits upon the cutting edge of the bucket and a spear extends from the frame outwardly from the cutting edge. As a spear is removed from a bale, friction retains the spear in the bale and the tractor exerts a pulling force through the bucket to release the spear. The pulling force is transmitted through a bolted connection of the frame upon the bucket. The bolt hole is generally drilled through the bucket near the bottom, or the end of the spear. Though this installation method allows for ready mounting and demounting of the spear implement, a hole remains in the bucket. As the hole is near the bottom, other uses of the bucket may cause leakage of fluids, gases, or granular matter from the hole upon the tractor, personnel, or the ground. Such leakage can cause a noticeable mess and farmers and ranchers dislike this installation method.

For each installation method, the bale implement has a spear attached to a frame where the frame connects to a bucket. The prior art frames have welded sockets that receive the spears. The sockets join to an elongated bracket by welding that also secures the balance spikes. The balance spikes insert within a bale and prevent inadvertent rotation, or turning, of the bale leading to a bale falling off the spear. Opposite the spear and spikes, the frame has two spaced apart angled members upon the bracket coming to a point away from the frame for securing beneath the bucket as previously described. The angled members prevent lateral rotation of the frame when under load, such as when the tractor turns carrying a bale. However, the welded frame of bracket, angled members, and sockets become an ungainly shape. The shape of the frame increases packaging costs, shipping expenses, warehousing fees, and retail merchandising efforts.

For skid steer loaders, prior art bale spears have a spear welded to a frame. The spear joins to a member that extends laterally approximately the width of the arms of a skid steer loader. The member includes two gussets that extend perpendicular to the spear and to the member. At each end, the member welds to a side plate that also extends perpendicular to the member, forming a generally I shape. Upon each end of the side plates, a rail attaches and spans parallel to the member. The gussets then join to the rails. The rails are slightly less in width than the member and recessed behind the member. The rails and side plates cooperate to frame around the member and provide stiffness to the bale spear implement. The single spear implement also has two balance spikes bolted to sockets spaced apart on the member so that spikes are parallel to the spear. A double spear implement has two spears joined to the member. The spears are mutually parallel and spaced apart with gussets perpendicular to both spears and joining to the rails. The existing bale spear frames surround the member anchoring the spears and prevent racking of the frame under load and allow for connection of the implement to a skid steer loader. However, the existing bale spear frames have various components that require welding and additional assembly labor.

The present invention overcomes the disadvantages of the prior art and provides a skid steer bale spear that connects to tractor or a loader using the Universal Skid Steer Quick Attach and a rigid member that supports the bale loading without use of a surrounding frame. The present invention has less frame components with the resulting reduction in the labor and material costs in manufacturing. This skid steer bale spear connects and disconnects readily from a tractor or a loader.

SUMMARY OF THE INVENTION

Generally, the present invention of a skid steer bale spear has a single member, or cross tube, to which join the spear and balance spikes or the multiples spears. The cross tube then has plates proximate each end welded to the cross tube for connection to a tractor or a skid steer loader. The plates have a spacing and orientation for the Universal Skid Steer Quick Attach. Additionally, the present invention includes a roll-back angle to the spear, foot grips, backstops, and detachable spears and spikes. The present invention calls for less resources, capital, labor, and materials for manufacturing. The cross tube, spear, and balance spikes can be shipped and merchandised in a compact form. At the farm or the ranch, the skid steer bale spear assembles readily in minutes with hand tools for ready connection to a tractor or loader.

There has thus been outlined, rather broadly, the more important features of the invention in order that the detailed description thereof that follows may be better understood and that the present contribution to the art may be better appreciated. The present invention also includes reinforcing gussets upon the plates, sockets for the bale spears, end plates, and sockets for the back stops. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the bucket bale spear is to provide a bale spear that can be shipped, stored, and retailed in a compact form.

Another object of the bucket bale spear is to provide such a bale spear that readily connects to the lifting arms of a tractor, Bobcat®, loader, or other prime mover.

Another object of the bucket bale spear is to provide such a bale spear that avoids a welded connection to the lifting arms of a prime mover.

Another object of the bucket bale spear is to provide such a bale spear that has a low cost of manufacturing so the farmers, ranchers, cooperatives, haulers, elevators, yards, and depots can readily purchase the bucket bale spear and its component parts through existing retail outlets.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
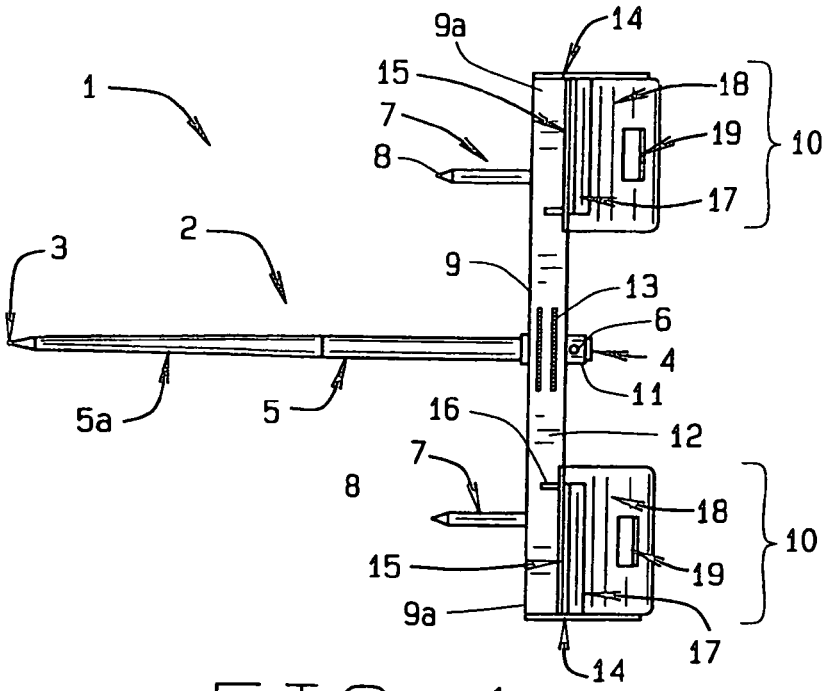
FIG. 1 shows a top view of the skid steer bale spear of the present invention.

The present invention overcomes the prior art limitations by providing a skid steer bale spear that adapts to the Universal Skid Steer Quick Attach and assembles with hand tools. Beginning the description with what a farm hand when standing upon the invention, FIG. 1 shows a top view of the parts of the skid steer bale spear 1. The present invention has a spear 2 with a pointed tip 3 denoting the front of the invention. Opposite the tip, the spear has a base 4. Between the tip and the base, the spear has a shaft 5 that may include a tapered portion 5a before the tip 3. Proximate the base, the shaft has an aperture 6 extending across its diameter slightly inward from the base for receiving a bolt. Spaced apart and mutually parallel, two balance spikes 7 flank the spear 2. Each spike has less length than the spear, generally less than one-third. Each spike has a tip 8 and an opposite base 9 that also has an aperture therethrough.

The spear 5 and spikes 7 connect to a frame with a cross tube 9 and plate assemblies 10 upon each end of the cross tube. Unlike the prior art, the cross tube has no parallel rails forming a frame. The cross tube is generally oriented perpendicular to the spear, or across the width of a loader. The cross tube exceeds the length of the spikes and has a length proportionate to the length of the spear. The cross tube has a socket 11 centered therein and extending across and through the cross tube. The socket receives the base 4 of the spear. The base extends into the socket and the aperture is aligned with a similar aperture in the socket and a bolt is placed through the socket and the base, securing the spear to the cross tube. The cross tube has a top surface 12 generally smooth. Alternatively, the top surface has at least one foot grip 13 located above the socket 11. The foot grips are generally parallel to the length of the cross tube and assist a person climbing upon the invention.

The cross tube has two opposite ends 9a outwardly from the spear. A plate assembly 10 attaches to each end. Each plate assembly begins with an end plate 14 upon an end 9a extending generally perpendicular to the cross tube. The end plate 14 extends rearward, or away from the spear. Perpendicular to the end plate, the plate assembly has the plate 15 that extends along side the cross tube generally inside of the spike 7 and opposite the spears. Opposite the end plate, the plate has a gusset 16 perpendicular to the plate 15 and towards the cross tube 9. The gusset is generally parallel to the end plate. Between the gusset and the end plate, the plate has a lip plate 17 upon an upper edge. The lip plate has a slight downward angle towards the cross tube but away from the spear. Opposite the lip plate, the plate assembly 10 has an attachment plate 18 that extends outwardly from the cross tube 9 and spans the width of the plate 15. The attachment plate extends outwardly from the end plate at a slight downward angle. The attachment plate has a slot 19 generally centered upon the lowest edge. Each end of the cross tube has a plate assembly 10 joined thereto for a two-point connection of the present invention to a loader.

Figure 2:
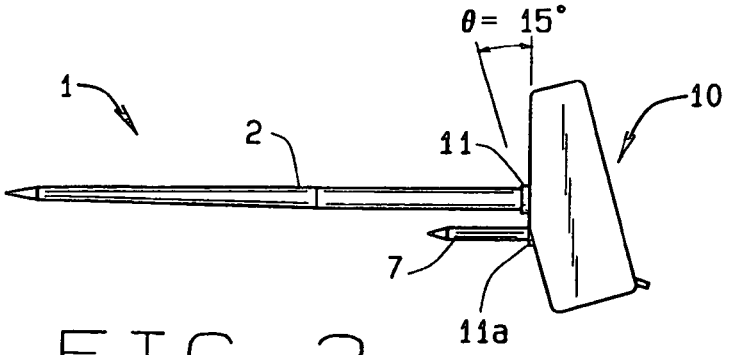
FIG. 2 describes a side view of the present invention with the spear oriented horizontally.

Turning the invention, FIG. 2 shows the invention from the side with an endplate 14 in the foreground. As before, the spear 2 connects to a socket 11. The socket receives the base of the spear into the cross tube 9 not shown as it is behind the plate assembly 10 and end plate. Outward from the spear, two spikes 7 each connect to a smaller socket 11a generally below the cross tube. Opposite the spear and slightly below the socket, the attachment plate 18 extends outwardly and downwardly from the end plate. The end plate has a truncated rectangular shape with the longitudinal axis of the end plate oriented generally perpendicular to the spear and the cross tube. In the preferred embodiment, the spear and the spikes have a fifteen degree angle upward, as at θ, or towards the longitudinal axis of the end plate. The angle upward, or rollback angle, seats a hay bale upon the spear towards the cross tube and upon the loader attachment so when a loader descends a hill, grade, or incline, the bale remains upon the spear and does not slide off.

Figure 3:
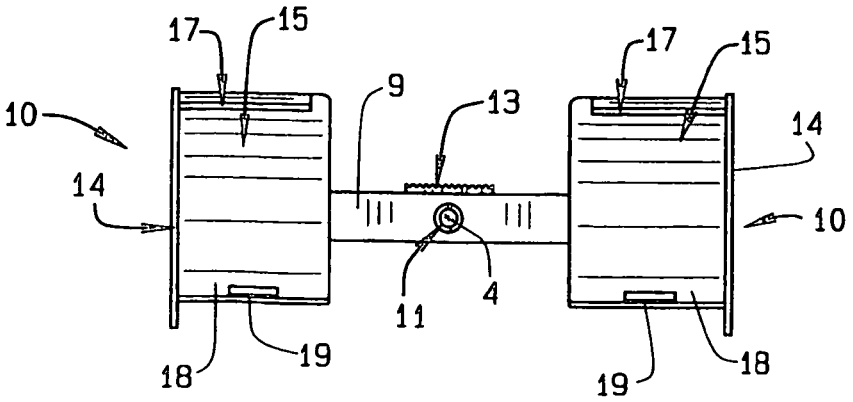
FIG. 3 is a rear view of the skid steer bale spear.

Looking behind the spear, FIG. 3 shows the rear of the invention ready for connection to a loader. The invention has a cross tube 9 with ends to which attach plate assemblies 10. The plate assemblies allow for the invention to connect with a loader using the Universal Skid Steer Quick Attach. The cross tube has at least one foot grip 13 centered upon the top. The foot grip has a plurality of teeth or other means for gripping the sole of a boot. Beneath the foot grip, the cross tube has a socket 11 centered upon it and extending through the cross tube. The socket receives the base 4 of the spear 2 generally in a bolted connection.

Upon each end of the cross tube, a plate assembly joins to the cross tube opposite the spear. FIG. 3 shows a rear view of a plate assembly and one plate assembly will be described though the description applies to both ends of the cross tube in a mirror image. Each plate assembly has an end plate 14, here shown on edge, at the end 9a of the cross tube. The end plate is generally perpendicular to the cross tube and centered upon the end. Upon the upper end of the end plate, a lip plate 17 extends perpendicular to the end plate and parallel to the cross tube. The lip plate has a slight decline towards the spear and a narrow width. Perpendicular to the end plate and beneath the lip plate, the plate assembly has the plate 15. The plate extends from the lip plate substantially along the length of the end plate. The plate abuts the cross tube upon the surface generally perpendicular to the top and opposite the spear. Opposite the lip plate, the plate assembly has the attachment plate 18 extending outwardly from the plate 15 and perpendicular to the end plate 14. The attachment plate extends outwardly from the end plate for a short distance at a downward angle away from the spear. The attachment plate has a slot 19 of a certain shape, here shown as rectangular, for gripping by a loader.

Figure 4:
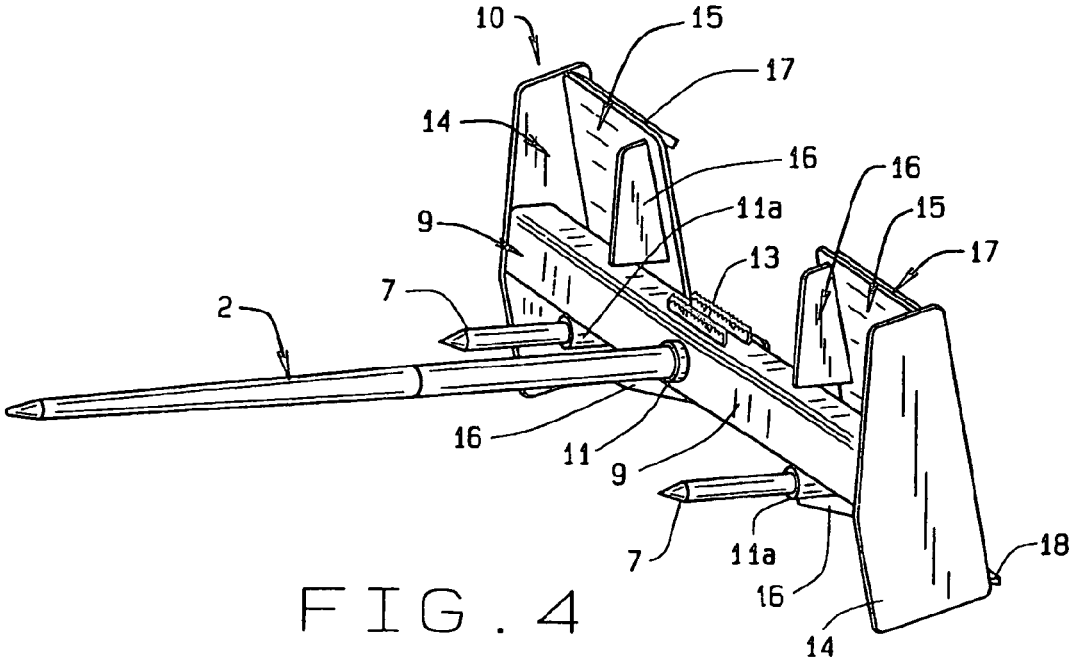
FIG. 4 describes a perspective view of the skid steer bale spear of the present invention ready for use.

Having described the invention in three views previously, FIG. 4 shows the invention in perspective for describing the attachment of the spikes and spear, and plate assemblies to the cross tube. As before, the cross tube 9 has an elongated shape, generally rectangular in cross section, with foot grips 13 upon the top at center and a socket 11 through the center of the cross tube. The socket receives the spear 2 as previously described. Outwardly from the center socket, the cross tube has two depending sockets 11a joining to the bottom surface of the cross tube and equally spaced from the spear. The sockets 11a receive the spikes 7 so that the tips of the spear and the spikes all face outwardly form the cross tube.

Upon each end of the cross tube, a plate assembly 10 attaches. The plate assembly has an end plate 14 generally perpendicular to the end and wider than the cross tube. The end plate extends above and below the cross tube. In the preferred embodiment, the end plate has a trapezoidal shape above the cross tube that accommodates the rollback angle of fifteen degrees. Perpendicular to the end plate and parallel to the cross tube, the lip plate 17 extends towards the center of the invention at a downward angle. The lip plate also attaches upon its length to the plate 15 that itself joins to the cross tube 9. The plate extends from the upper end of the end plate and the lip plate, across the inside surface of the cross tube and beneath the cross tube. Opposite the end plate, each plate assembly has a gusset 16 that extends from the lip plate towards the cross tube and from below the cross tube tapering to the attachment plate 18. The gusset is mutually parallel and spaced apart from the end plate and has a notch for accommodating the cross tube. In this embodiment, the plate assemblies are welded together and then attached to the cross tube by welding while the spikes and spear secure into the sockets by bolting or other mechanical means.

Figure 5:
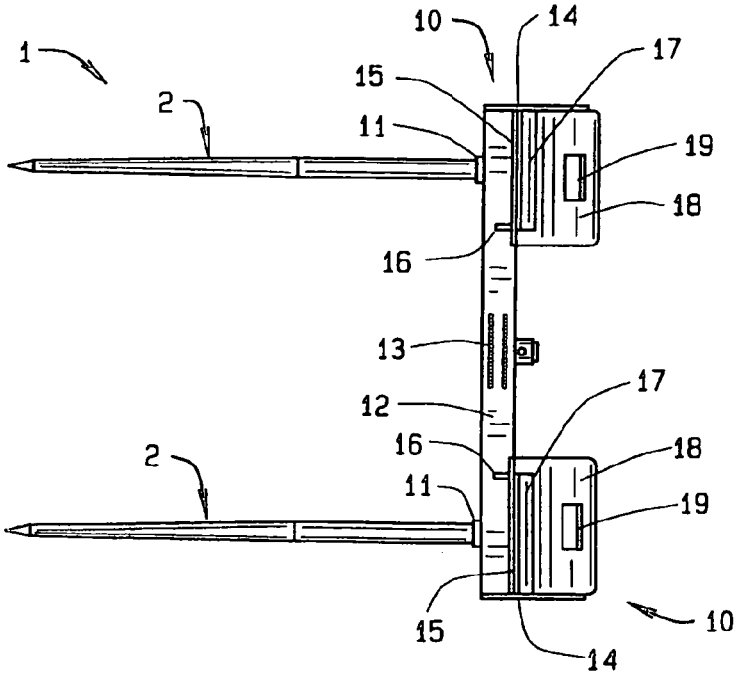
FIG. 5 shows a top view of a two spear embodiment of the skid steer bale spear.

FIG. 5 shows an alternate embodiment of the invention having two spears. As before, this embodiment has a cross tube 9, generally elongated with foot grips 13 at the center upon the top. Outwardly from the center, the cross tube has two ends to which attach plate assemblies 10. Each plate assembly has an end plate 14, a plate 15, a lip plate 17, a gusset 16, an attachment plate 18, and a slot 19 within the attachment plate as previously described. Inwardly of each plate assembly, a spear 2 seats within a socket 11 in a welded connection. The axis of each spear is generally aligned with the center of the slot 19 in each plate assembly. In this alignment, each spear is generally centered upon the plate 15 for lifting of hay bales and other objects by the loader.

Figure 6:
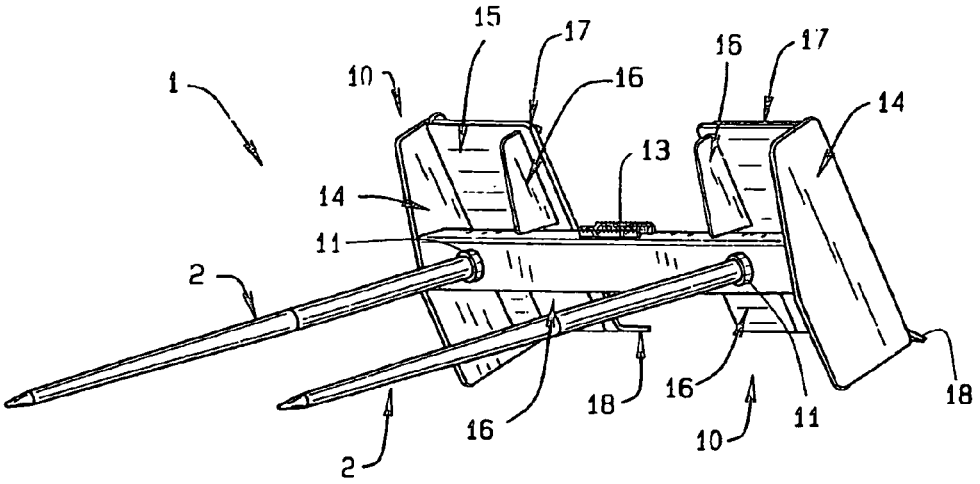
FIG. 6 describes a perspective view of the two spear embodiment of the skid steer bale spear ready for use; and, FIG. 7 shows a perspective view of a three spear embodiment of the skid steer bale spear with a backstop.

The alternate embodiment of two spears appears in perspective view in FIG. 6. Upon each end of the cross tube, a plate assembly 10 attaches. The plate assembly has an end plate 14 generally perpendicular to the end and wider than the cross tube while extending above and below the cross tube. In the preferred embodiment, the end plate has a trapezoidal shape above the cross tube that accommodates the rollback angle of 15 degrees. Perpendicular to the end plate and parallel to the cross tube, the lip plate 17 extends towards the center of the invention at a downward angle opposite the spear and towards a loader. The lip plate also attaches upon a lengthwise edge to the plate 15 that itself joins to the cross tube 9. The plate extends from the upper end of the end plate and the lip plate, across the inside surface of the cross tube, i.e., towards the tractor or loader, and beneath the cross tube. Opposite the end plate, each plate assembly has a gusset 16 that extends from the lip plate towards the cross tube and from below the cross tube slightly widening to the attachment plate 18. The gusset has a narrow width proximate the lip plate, widening towards the cross tube 9. The gusset is mutually parallel and spaced apart from the end plate and has a notch for accommodating the cross tube. Below the notch, the gusset widens towards the bottom edge of the plate 15. This figure shows the attachment plate 18 in further detail. The attachment plate bends upwardly from the plane of the plate 15 and towards the loader. In this embodiment, the plate assemblies are welded together and then attached to the cross tube by welding while the spikes and spear secure into the sockets by mechanical means.

Figure 7:
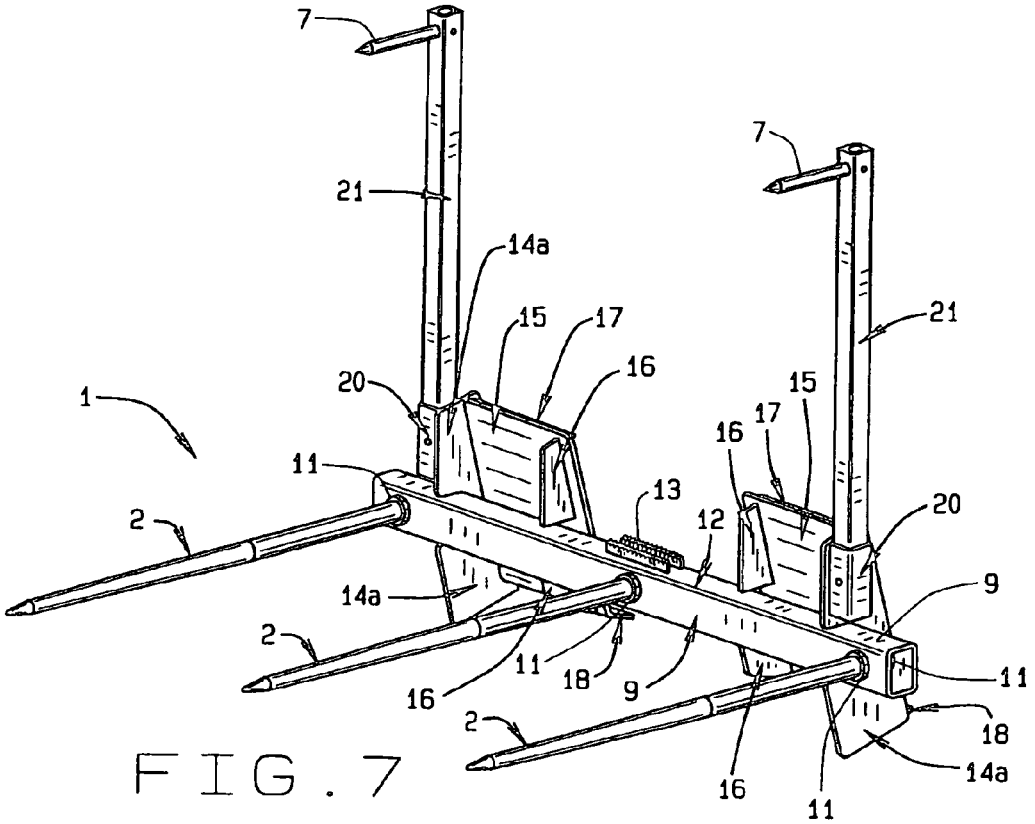

The alternate embodiment of three spears appears in FIG. 7. This embodiment has a cross tube 9, generally a hollow tube and preferably rectangular. This cross tube has three sockets 9 equally spaced about one socket locating at the center of the cross tube. The sockets extend through the width of the tube and receive the spears as previously described. The spears are generally mutually parallel and facing the same direction. Upon the surface of the tube perpendicular to the spears, the cross tube has at least one foot grip 13. Here the pair of foot grips has teeth and a mutual spacing to promote gripping of a boot sole. The cross tube has two opposite ends and one socket is located proximate each end.

Near each end, a plate assembly 10 attaches, though inward from the end, as in previous embodiments. As the plate assemblies attach to each end and mirror each other, one plate assembly will be described. The plate assembly beings with an endplate 14a oriented perpendicular to the cross tube and locating inwardly from the end and the socket near the end. The endplate has a notch for seating upon three sides, or all sides but one, of the cross tube. Below the cross tube, the endplate has a rectangular shape and above the cross tube the endplate takes on a more trapezoidal shape as it narrows. Above the cross tube, the endplate 14a has a second socket 20 attached outwardly upon the endplate so the axis of the second socket extends perpendicular to the cross tube. The second socket receives a tubular backstop 21 that extends upwardly from the plate assembly for approximately the length of a spear 2. Opposite the socket, the backstop has an aperture for receiving a spike 7 generally perpendicular to the backstop and parallel to the spears. The backstop allows a farmer or rancher to load a second hay bale upon and above the hay bales upon the spears.

Opposite the spears, a plate 15 extends from the edge of the endplate 14a inwardly towards the center of the cross tube. The plate abuts the cross tube 9 generally opposite the socket for securement by welding or alternatively by bolting. The plate is generally rectangular in shape with its lateral axis parallel to the length of the cross tube and its longitudinal axis perpendicular to the cross tube. Above the cross tube, the plate has a lip plate 17 upon its edge as previously described. Parallel to and mutually spaced apart from the end plate 14a, the plate assembly has a gusset 16. The gusset is generally planar with a notched trapezoidal shape, where the notch admits the cross tube. The gusset generally welds perpendicular to the plate 15 for stiffening the longitudinal edge towards the center of the cross tube. Alternatively, the gusset has an upper portion and a lower portion generally coplanar. The upper portion narrows in width above the cross tube and the lower portion widens below the cross tube. Beneath the plate and between the gusset and the end plate, an attachment plate 18 extends downwardly as previously described. This three spear embodiment also has the spears at a fifteen degree rollback angle to the plate assembly as previously described.

From the aforementioned description, a skid steer spear device has been described. The device is uniquely capable of supporting spears upon a single tubular cross tube and compact shipment and storage. This device assembles a frame of plates upon a tube to follow the Universal Skid Steer Quick Attach method of connecting devices to tractors, loaders, and other equipment. The device and its various components may be manufactured from many materials, including but not limited to, steel, polymers, ABS plastic, polyvinyl chloride, polyethylene, polypropylene, ferrous and non-ferrous metals, their alloys, and composites.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A device that receives at least one bale of agricultural product and that attaches to a piece of equipment using the Universal Skid Steer Quick Attach wherein said device disassembles into a compact form for storage and shipment, comprising:

at least one spear having a narrow elongated shape and a pointed tip, and a base opposite said tip, said base having an aperture therethrough;

a frame including a cross tube receiving said at least one spear, said cross tube being perpendicular to said spear, said cross tube having two spaced apart ends generally outwardly of said at least one spear, and two plate assemblies joining to each of said ends, wherein each of said plate assemblies adapting to connect with Universal Skid Steer Quick Attach to a piece of equipment;

each of said plate assemblies having an end plate generally upon said end of said cross tube and perpendicular to the length of said cross tube; a plate perpendicular to said end plate and adjoining said cross tube, a lip plate upon said plate above said cross tube, an attachment plate opposite said lip plate and upon said plate below said cross tube, and at least one gusset mutually parallel and spaced apart from said end plate, said gusset extending above said cross tube and below said cross tube, thus said plate assembly connecting to a piece of equipment using universal skid steer quick attach.

2. The bale receiving device of claim 1 further comprising:

said cross tube having a generally hollow cross section, a top surface, a front surface perpendicular to said top surface and a rear surface opposite said front surface, at least one socket extending through said front surface and said rear surface and perpendicular to said cross tube for receiving said at least one spear, at least one foot grip joining to said top surface, generally centered upon said cross tube.

3. The bale receiving device of claim 2 wherein said at least one spear in cooperation with said cross tube and said plate assemblies attains at least a ten degree angle above the horizontal thus aiding the retention of at least one bale of agricultural product upon said device during usage upon rough terrain.

4. The bale receiving device of claim 2 further comprising:

said device having one spear generally centered upon said cross tube beneath said foot grip, two sockets mutually parallel and spaced away and beneath said spear, each of said sockets receiving a spike, and a plate assembly upon each end.

5. The bale receiving device of claim 2 further comprising:

said device having two spears mutually parallel and spaced apart upon said cross tube, and a plate assembly upon each end; and, each of said spears locating in line with the center of each of said plate assemblies.

6. The bale receiving device of claim 2 further comprising:

said device having three spears mutually parallel with one of said spears generally centered upon said cross tube beneath said foot grip and the other of said spears spaced apart from the center of said cross tube, and a plate assembly upon each end, each plate assembly locating inwardly of the axis of each spear outwardly from the center of said cross tube.

7. The bale receiving device of claim 1 further comprising:

said attachment plate having a slot therein generally parallel to said cross tube.

*8. A device that receives at least one bale of agricultural product and that attaches to a piece of equipment using the Universal Skid Steer Quick Attach wherein said device disassembles into a compact form for storage and shipment, comprising:*

*at least one spear having a narrow elongated shape and a pointed tip, and a base opposite said tip;*

*a frame including a cross tube receiving said at least one spear, said cross tube being perpendicular to said spear, said cross tube having two spaced apart ends generally outwardly of said at least one spear, and two plate assemblies joining to each of said ends, wherein each of said plate assemblies adapting to connect with Universal Skid Steer Quick Attach to a piece of equipment;*

*each of said plate assemblies having an end plate generally upon said end of said cross tube and perpendicular to the length of said cross tube; a plate perpendicular to said end plate and adjoining said cross tube, a lip plate upon said plate above said cross tube, an attachment plate opposite said lip plate and upon said plate below said cross tube, and at least one gusset mutually parallel and spaced apart from said end plate, said gusset extending above said cross tube and below said cross tube, thus said plate assembly connecting to a piece of equipment using universal skid steer quick attach.*

* * * * *